United States Patent
Yang et al.

(10) Patent No.: US 11,891,563 B2
(45) Date of Patent: Feb. 6, 2024

(54) PH-SENSITIVE TEMPORARY PLUGGING AGENT, PREPARATION METHOD THEREOF, AND USE THEREOF IN EXPLOITATION OF LOW-PERMEABILITY OIL RESERVOIR

(71) Applicant: YANGTZE UNIVERSITY, Jingzhou (CN)

(72) Inventors: Huan Yang, Jingzhou (CN); Zhuyang Jiang, Jingzhou (CN); Xiaorong Yu, Jingzhou (CN); Gaoshen Su, Jingzhou (CN); Kailu Wang, Jingzhou (CN); Beibei Zhang, Jingzhou (CN); Yang Li, Jingzhou (CN); Chang Xiao, Jingzhou (CN)

(73) Assignee: YANGTZE UNIVERSITY, Jingzhou (CN)

( * ) Notice: Subject to any disclaimer, the term of this patent is extended or adjusted under 35 U.S.C. 154(b) by 57 days.

(21) Appl. No.: 17/469,669

(22) Filed: Sep. 8, 2021

(65) Prior Publication Data
US 2022/0333001 A1    Oct. 20, 2022

(30) Foreign Application Priority Data

Apr. 15, 2021 (CN) .......................... 202110405513.0

(51) Int. Cl.
| | |
|---|---|
| *C09K 8/035* | (2006.01) |
| *C09K 8/42* | (2006.01) |
| *C09K 8/44* | (2006.01) |
| *C09K 8/514* | (2006.01) |

(52) U.S. Cl.
CPC .............. *C09K 8/426* (2013.01); *C09K 8/035* (2013.01); *C09K 8/44* (2013.01); *C09K 8/514* (2013.01)

(58) Field of Classification Search
CPC .......... C09K 8/426; C09K 8/035; C09K 8/44; C09K 8/514; C09K 8/512; C09K 8/5086
See application file for complete search history.

(56) References Cited

FOREIGN PATENT DOCUMENTS

| CN | 102382332 A | * | 3/2012 |
| CN | 110484224 A | * | 11/2019 |

OTHER PUBLICATIONS

Gao (J. Gao et al, pH-sensitive carboxymethyl chitosan hydrogels via acid-labile ortho ester linkage as an implantable drug delivery system, Carbohydrate Polymers, 225 (2019) 115237 (p. 1-9).*
Chen (L. Chen et al, Novel pH, ion sensitive polyampholyte gels based on carboxymethyl chitosan and gelatin, Polym Int 52, (2003), 56-6.*

* cited by examiner

*Primary Examiner* — Kumar R Bhushan
(74) *Attorney, Agent, or Firm* — Tutunjian & Bitetto, P.C.

(57) ABSTRACT

A pH-sensitive temporary plugging agent and its preparation method, and the use thereof in exploitation of a low-permeability oil reservoir are disclosed. The temporary plugging agent is prepared by raw materials including, in percentages by mass, 3-8% of carboxymethyl chitosan, 0.2-0.7% of gelatin, 0.1-0.6% of an initiator, 5-15% of a toughener, and a balance of water, wherein the initiator is a solution of $AgNO_3$ in ammonia water having a concentration of 0.1-0.3 mol/L, and the toughener is a carboxyl-terminated hyperbranched polyester.

7 Claims, 3 Drawing Sheets

PH-SENSITIVE TEMPORARY PLUGGING AGENT, PREPARATION METHOD THEREOF, AND USE THEREOF IN EXPLOITATION OF LOW-PERMEABILITY OIL RESERVOIR

CROSS REFERENCE TO RELATED APPLICATION

This application claims the benefit and priority of Chinese Patent Application No. 202110405513.0, entitled "pH-sensitive temporary plugging agent, preparation method thereof, and use thereof in exploitation of low-permeability oil reservoir" filed with the Chinese National Intellectual Property Administration on Apr. 15, 2021, which is incorporated herein by reference in its entirety.

TECHNICAL FIELD

The present disclosure relates to the technical field of exploitation of oilfields, and in particular to a pH-sensitive temporary plugging agent, a preparation method thereof, and use thereof in exploitation of a low-permeability oil reservoir.

BACKGROUND ART

Horizontal well is a special well that has a maximum inclination angle reaching or approaching 90° (generally not less than 86°) and maintains a certain horizontal length in the target formation. Generally, the horizontal well is suitable for the thin hydrocarbon bearing formation or the fractured hydrocarbon reservoir, with the purpose of increasing the bare area of the hydrocarbon bearing formation. Horizontal well drilling has been greatly developed in China since 1990s. More than a hundred of horizontal wells of various types have been drilled in Shengli Oilfield, and the drilling level and speed of the horizontal well have been continuously improved.

However, the problems of uneven distribution of the acidizing fluid along the direction of the horizontal section, fingering of the acidizing fluid, and decline of production are common in segmented acidification of old horizontal wells in an oilfield. Temporary-plugging acidification is an effective treatment measure. However, the temporary plugging agent currently used has poor acid resistance and low plugging efficiency, and the plugging agent is not easy to degrade and pollute the reservoir after the formation is reformed, which leads to a large amount of acidizing fluid entering a high-permeability zone or an oil reservoir with depleted pressure, and aggravates the heterogeneity among layers and segments, resulting in the waste of resources and meanwhile bringing huge economic loss.

SUMMARY

In view of this, the aim of the present disclosure is to provide a pH-sensitive temporary plugging agent and its preparation method, and the use thereof in exploitation of a low-permeability oil reservoir. The pH-sensitive temporary plugging agent according to the present disclosure not only has good plugging effect, but also has strong acid resistance. It could stably exist under acidic conditions, and could be degraded with alkaline solvent, has little damage to formations.

To achieve the aforementioned object of the present disclosure, the present disclosure provides the following technical solutions.

The present disclosure provides a pH-sensitive temporary plugging agent, which is prepared from raw materials comprising, in percentages by mass,
  3-8% of carboxymethyl chitosan,
  0.2-0.7% of gelatin,
  0.1-0.6% of an initiator,
  5-15% of a toughener, and
  a balance of water,
wherein the initiator is a solution of $AgNO_3$ in ammonia water having a concentration of 0.1-0.3 mol/L, and
the toughener is a carboxyl-terminated hyperbranched polyester.

In some embodiments, the pH-sensitive temporary plugging agent is prepared from raw materials comprising, in percentages by mass,
  3.5-7% of carboxymethyl chitosan,
  0.3-0.6% of gelatin,
  0.2-0.5% of the initiator,
  6.5-14.5% of the toughener, and
  the balance of water.

In some embodiments, the toughener is one or more selected from the group consisting of carboxyl-terminated hyperbranched polyester SeHBP C10, carboxyl-terminated hyperbranched polyester SeHBP C20, carboxyl-terminated hyperbranched polyester SeHBP C30, and carboxyl-terminated hyperbranched polyester SeHBP C40.

The present disclosure provides a method for preparing the pH-sensitive temporary plugging agent as described in the aforementioned technical solutions, which includes the following steps:
  mixing carboxymethyl chitosan, gelatin, the initiator, the toughener with water to obtain a final mixed solution; and
  subjecting the final mixed solution to a crosslinking reaction at 40-60° C. to obtain the pH-sensitive temporary plugging agent.

In some embodiments, mixing carboxymethyl chitosan, gelatin, the initiator, the toughener with water includes steps of
  mixing carboxymethyl chitosan, gelatin with one part of water at 50-70° C. to obtain a first mixed solution;
  adding the initiator dropwise into the first mixed solution to obtain a second mixed solution;
  mixing the toughener with the other part of water to obtain an aqueous solution of the toughener; and
  mixing the second mixed solution with the aqueous solution of the toughener to obtain the final mixed solution.

In some embodiments, a mass ratio of one part of water to the other part of water is in the range of (1-2):1.

In some embodiments, the crosslinking reaction is performed for 0.5-2 hours.

In some embodiments, the method further includes, after the crosslinking reaction, lyophilizing the resulting crosslinked product.

The present disclosure provides use of the pH-sensitive temporary plugging agent as described in the aforementioned technical solutions or the pH-sensitive temporary plugging agent prepared by the method as described in the aforementioned technical solutions in exploitation of a low-permeability oil reservoir.

The present disclosure provides a pH-sensitive temporary plugging agent, which is prepared from raw materials including, in percentages by mass, 3-8% of carboxymethyl chitosan, 0.2-0.7% of gelatin, 0.1-0.6% of an initiator, 5-15% of a toughener, and a balance of water, wherein the initiator is a solution of $AgNO_3$ in ammonia water having a concentration of 0.1-0.3 mol/L, and the toughener is a carboxyl-terminated hyperbranched polyester. In the present disclosure, carboxymethyl chitosan and gelatin, which are used as the main raw materials, could be copolymerized in the presence of auxiliary materials (the toughener and the initiator), and thus the resultant temporary plugging agent has a compact and stable crosslinked structure. Moreover, the temporary plugging agent is a pH-sensitive temporary plugging agent, when the pH value in the medium changes, the hydrophilic performance of free amino groups and carboxyl groups on the molecular chains of carboxymethyl chitosan and gelatin changes significantly, thereby showing different swelling properties as changes in pH. Under the condition that the pH value of the medium is less than 7, —COOH groups on the chains of carboxymethyl chitosan and gelatin are partially ionized to —COO⁻ groups, and the electrostatic repulsion and hydrophilicity functions among —COO⁻ groups cause the gel network to expand, thereby increasing the pores and free spaces in the hydrogel and absorbing more water accordingly. Under the condition that the pH value of the medium is larger than 7, —COOH groups on the chains of carboxymethyl chitosan and gelatin are completely ionized into —COO⁻ groups, and $—NH_3^+$ is deprotonated to form $—NH_2$, with the increase of alkalinity, $—NH_3^+$ groups are completely deprotonated, which leads to the decrease of solubility of molecular chains and the formation of new hydrogen bonds, resulting in the shrinkage of polymer chains and thereby the decrease of the swelling ratio. Therefore, the pH-sensitive temporary plugging agent according to the present disclosure not only has good plugging effect, but also has strong acid resistance. It could exist stably under acidic conditions, could be degraded just by an alkaline solvent, causes less degradation residues and little damage to formations, and could indirectly enhance the oil recovery ratio of oilfields. Therefore, it is especially suitable for use in exploitation of a low-permeability oil reservoir.

The method for preparing the pH-sensitive temporary plugging agent according to the present disclosure is simple, easy in operation and convenient for scale production.

DETAILED DESCRIPTION OF THE EMBODIMENTS

Definition

Figure 1:
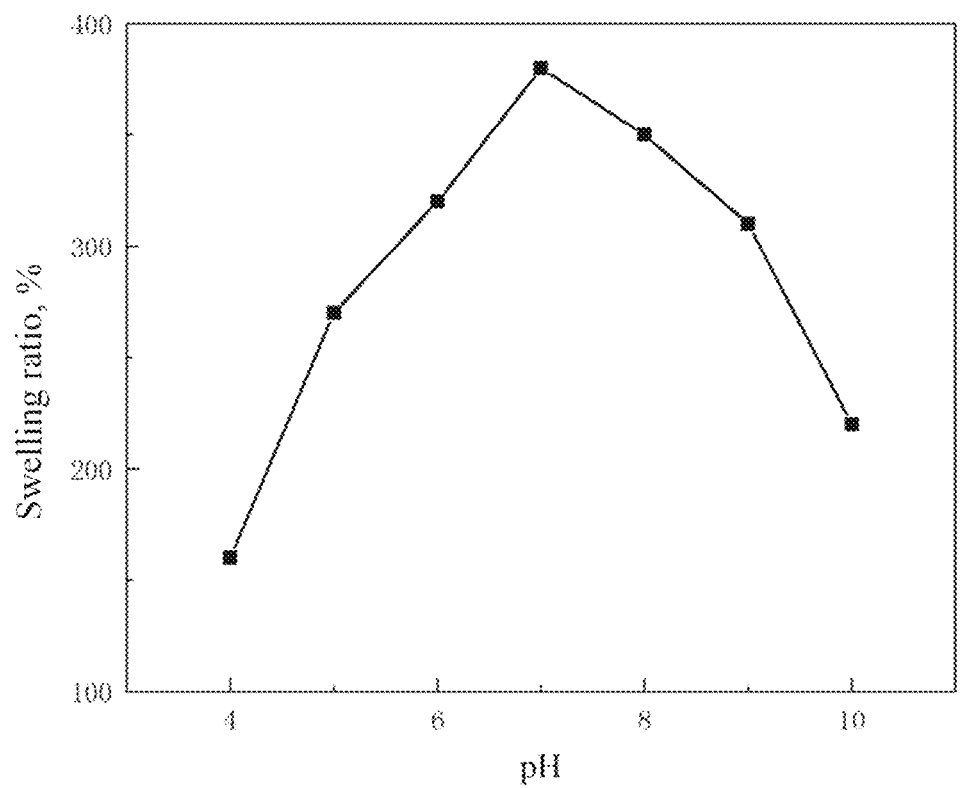
FIG. 1 shows the curve graph illustrating the swelling ratios of the temporary plugging agent obtained in Example 1 in media having different pH values.

The term "swelling ratio" used herein, unless otherwise specified, represents the ratio of the volume of the pH-sensitive temporary plugging agent after expansion to its volume before expansion.

The term "swelling rate" used herein, unless otherwise specified, represents the rate of the swelling of the pH-sensitive temporary plugging agent.

The term "degradation ratio" used herein, unless otherwise specified, represents the ratio of viscosity of the pH-sensitive temporary plugging agent after degradation to its viscosity before degradation.

The term "degradation rate" used herein, unless otherwise specified, represents the rate of the degradation of the pH-sensitive temporary plugging agent.

The present disclosure provides a pH-sensitive temporary plugging agent, which is prepared from raw materials including, in percentages by mass,
 3-8% of carboxymethyl chitosan,
 0.2-0.7% of gelatin,
 0.1-0.6% of an initiator,
 5-15% of a toughener, and
 a balance of water,
 wherein the initiator is a solution of $AgNO_3$ in ammonia water, having a concentration of 0.1-0.3 mol/L, and
 the toughener is a carboxyl-terminated hyperbranched polyester.

The raw materials, from which the pH-sensitive temporary plugging agent according to the present disclosure is prepared, includes 3-8%, and preferably 3.5-7% by mass of carboxymethyl chitosan. In the present disclosure, there is no special requirement for the source of carboxymethyl chitosan, and a commercially-available product well known to those skilled in the art may be used. Carboxymethyl chitosan (CMC) is a water-soluble chitosan derivative, which has a carboxymethyl substituent on a primary hydroxyl group or an amino group or both of the sites of a glucosamine unit of chitosan, namely O-carboxymethyl chitosan, N-carboxymethyl chitosan and N,O-carboxymethyl chitosan. The special structure of carboxymethyl chitosan could increase the crosslinking state and toughness of the polymer, and its molecular chain would swell to different degrees with the change of pH value, thereby affecting the degradation performance of the polymer.

The raw materials, from which the pH-sensitive temporary plugging agent according to the present disclosure is prepared, includes 0.2-0.7%, and preferably 0.3-0.6% by mass of gelatin. In the present disclosure, there is no special requirement for the source of gelatin, and gelatin well known to those skilled in the art may be used. In the present disclosure, gelatin would form a random conformation when the temperature rises, and would be copolymerized and crosslinked with carboxymethyl chitosan, also the gelatin moieties could support the polymer molecules during copolymerization, and thereby the temporary plugging agent has a more stable structure and a better performance. Moreover, the side chain of gelatin has a strong activity, which is beneficial to the occurrence of polymerization reaction. In addition, gelatin itself is a kind of protein, which has the advantages of environmental friendliness and biocompatibility.

The raw materials, from which the pH-sensitive temporary plugging agent according to the present disclosure is prepared, includes 0.1-0.6%, and preferably 0.2-0.5% by mass of an initiator. In the present disclosure, the initiator is a solution of $AgNO_3$ in ammonia water. The solution of $AgNO_3$ in ammonia water is a solution formed by mixing $AgNO_3$ with ammonia water with a mass concentration of 26%. The solution of $AgNO_3$ in ammonia water has a concentration (i.e., the $AgNO_3$ concentration in the solution of $AgNO_3$ in ammonia water) of 0.1-0.3 mol/L, wherein $AgNO_3$ acts as an effective component of the initiator, and ammonia water acts as the solvent of $AgNO_3$ to prevent an oxidation-reduction reaction of $AgNO_3$. In the present disclosure, there is no special requirement for the source of the initiator, and a commercially-available product well known to those skilled in the art or one prepared by method(s) well known to those skilled in the art may be used. In the present disclosure, the initiator provides crosslinking points for the crosslinking reaction(s), improves the crosslink density of carboxymethyl chitosan, thereby making the crosslinked structure more compact and stable.

The raw materials, from which the pH-sensitive temporary plugging agent according to the present disclosure is prepared, includes 5-15%, and preferably 6.5-14.5% by mass of a toughener. In the present disclosure, the toughener is a carboxyl-terminated hyperbranched polyester. In some embodiments, the carboxyl-terminated hyperbranched polyester includes one or more carboxyl-terminated hyperbranched polyester SeHBP C10, carboxyl-terminated hyperbranched polyester SeHBP C20, carboxyl-terminated hyperbranched polyester SeHBP C30, and carboxyl-terminated hyperbranched polyester SeHBP C40. Each of the carboxyl-terminated hyperbranched polyester SeHBP C10, carboxyl-terminated hyperbranched polyester SeHBP C20, carboxyl-terminated hyperbranched polyester SeHBP C30 and carboxyl-terminated hyperbranched polyester SeHBP C40 is a modified polymer with an aromatic hyperbranched polyester as the backbone and a large number of active carboxyl groups at the terminal. In the present disclosure, there is no special requirement for the source of the toughener, and a commercially-available product well known to those skilled in the art may be used. In some embodiments of the present disclosure, the carboxyl-terminated hyperbranched polyesters are purchased from Seebio Biotech Co., Ltd., Shanghai, China, wherein the carboxyl-terminated hyperbranched polyester SeHBP C10 is of model C103 and has a viscosity average molecular weight of 6,400; the carboxyl-terminated hyperbranched polyester SeHBP C20 is of model C203 and has a viscosity average molecular weight of 5,200; the carboxyl-terminated hyperbranched polyester SeHBP C30 is of model C303 and has a viscosity average molecular weight of 5,700; the carboxyl-terminated hyperbranched polyester SeHBP C40 is of model C403 and has a viscosity average molecular weight of 7,600. In the present disclosure, the viscosity average molecular weight is determined according to ASTM D4001-2013. In the present disclosure, a crosslinked network structure is formed in the aqueous solution of the toughener, which is beneficial to capture carboxymethyl chitosan in polymer chains, and functions such as hydrogen bonds, hydrophobic forces, electrostatic forces among the polymer chains work together to enhance the overall toughness, thereby achieving enhanced overall temperature resistance and acid resistance.

The raw materials, from which the pH-sensitive temporary plugging agent according to the present disclosure is prepared, also includes the balance of water. In the present disclosure, there is no special requirement for water, and water well known to those skilled in the art may be used. In some embodiments of the present disclosure, deionized water is used.

In the present disclosure, carboxymethyl chitosan and gelatin, which are used as main materials, could be copolymerized in the presence of auxiliary materials (i.e. the toughener and the initiator), and the resultant temporary plugging agent has a compact and stable crosslinked structure and good plugging effect. Moreover, the temporary plugging agent is a pH-sensitive temporary plugging agent, when the pH value in the medium changes, the hydrophilic performance of free amino groups and carboxyl groups on the molecular chains of carboxymethyl chitosan and gelatin changes significantly, thereby showing different swelling properties as changes in pH. Specifically, the pH-sensitive temporary plugging agent according to the present disclosure has strong acid resistance, and could exist stably under acidic conditions, could be degraded just by an alkaline solvent, cause less degradation residues and little damage to formations, and could indirectly enhance the oil recovery ratio of oilfields.

The present disclosure provides a method for preparing the pH-sensitive temporary plugging agent as described in the aforementioned technical solutions, which includes the following steps:

mixing carboxymethyl chitosan, gelatin, the initiator, the toughener with water to obtain a final mixed solution; and subjecting the final mixed solution to a crosslinking reaction at 40-60° C. to obtain the pH-sensitive temporary plugging agent.

In the present disclosure, carboxymethyl chitosan, gelatin, the initiator, the toughener are mixed with water to obtain the final mixed solution. In the present disclosure, mixing carboxymethyl chitosan, gelatin, the initiator, the toughener with water is performed as follows: mixing carboxymethyl chitosan, gelatin with one part of water at 50-70° C. to obtain a first mixed solution; adding the initiator dropwise into the first mixed solution to obtain a second mixed solution; mixing the toughener with the other part of water to obtain an aqueous solution of the toughener; and mixing the second mixed solution with the aqueous solution of the toughener to obtain the final mixed solution.

In some embodiments of the present disclosure, mixing carboxymethyl chitosan, gelatin with one part of water is carried out under the condition of stirring. In some embodiments, the stirring is performed for 1 hour. In some embodiments of the present disclosure, the initiator is added dropwise into the first mixed solution. In some embodiments of the present disclosure, a mass ratio of the one part of water to the other part of water is in the range of (1-2):1, and more preferably 1.5:1, and the one part of water and the other part of water constitute the total amount of water in the temporary plugging agent. In some embodiments of the present disclosure, the toughener and the other part of water are mixed at room temperature (i.e., without additional heating or cooling). In the present disclosure, there is no special limitation on the time for mixing the toughener and the other part of water, as long as the toughener is fully dissolved in the other part of water.

In the present disclosure, after the final mixed solution is obtained, the final mixed solution is subjected to a crosslinking reaction at 40-60° C. to obtain the pH-sensitive temporary plugging agent. In some embodiments of the present disclosure, the crosslinking reaction is preformed at 45-55° C. In some embodiments, the crosslinking reaction is performed for 0.5-2 hours. In some embodiments, the crosslinking reaction is carried out under the condition of stirring. In the present disclosure, there is no special limitation on the stirring speed, as long as the crosslinking reaction is fully carried out. In the present disclosure, the method further includes after the crosslinking reaction, lyophilizing the resulting crosslinked product. In the present disclosure, there is no special limitation on the means for lyophilizing, and a means for lyophilizing well known to those skilled in the art may be adopted.

The method for preparing the pH-sensitive temporary plugging agent according to the present disclosure, is simple, easy in operation, and convenient for scale production.

The present disclosure also provides use of the pH-sensitive temporary plugging agent as described in the aforementioned technical solutions or the pH-sensitive temporary plugging agent prepared by the method as described in the aforementioned technical solutions in exploitation of a low-permeability oil reservoir. The pH-sensitive temporary plugging agent according to the present disclosure not only has good plugging effect, but also has strong acid resistance. It could exist stably under acidic conditions, and could be degraded just by an alkaline solvent after the completion of temporary plugging and acidification of oilfields. In practical use, the degradation ratio of the temporary plugging agent could be improved by appropriately increasing the pH value of the alkaline solvent, and thus the degradation residues could be reduced, thereby reducing the pollution and damage to formations and indirectly enhancing oil recovery ratio of the oilfield. Therefore, the pH-sensitive temporary plugging agent is especially suitable for exploitation of a low-permeability oil reservoir.

The pH-sensitive temporary plugging agent according to the present disclosure, the preparation method thereof, and the use thereof in exploitation of a low-permeability oil reservoir are described below in detail in connection with examples, but they could not be understood as limiting the claimed scope of the present disclosure.

EXAMPLE 1

A pH-sensitive temporary plugging agent was prepared according to the following procedures:

6 g of carboxymethyl chitosan and 0.5 g of gelatin were dissolved in 60 g of deionized water at 60° C., and they were stirred for 1 hour to be uniform, to obtain a first mixed solution. 0.4 g of a solution of $AgNO_3$ in ammonia water with a concentration of 0.1 mol/L, namely the initiator, was taken and added dropwise into the first mixed solution to obtain a second mixed solution.

11 g of the toughener (carboxyl-terminated hyperbranched polyester SeHBP C10) was taken and dissolved in 40 g of deionized water at room temperature to obtain an aqueous solution of the toughener.

The second mixed solution was mixed with the aqueous solution of the toughener, and the resulting mixture was stirred at 60° C. for 1 hour to undergo the crosslinking reaction. The resulting crosslinked product was lyophilized, to obtain the pH-sensitive temporary plugging agent.

(1) Test of the swelling property of the prepared pH-sensitive temporary plugging agent.

(1.1) Swelling Test of the temporary plugging agent in different pH value media.

The temporary plugging agent was subjected to a test for swelling ratios in media having pH values of 4, 5, 6, 7, 8, 9 and 10, respectively. The test results were shown in FIG. 1. As can be seen from FIG. 1, when the pH value of the medium is less than 7, the gel network of the temporary plugging agent expands, thereby increasing the pores and free spaces in the gel and absorbing more water accordingly; when the pH value of the medium is larger than 7, the temporary plugging agent exhibits decreased swelling performance, its swelling rate decreases and with the increase in the pH value of the alkaline medium, the swelling ratio is decreased instead.

(1.2) Swelling test of the temporary plugging agent in medium with pH=7.

Figure 2:
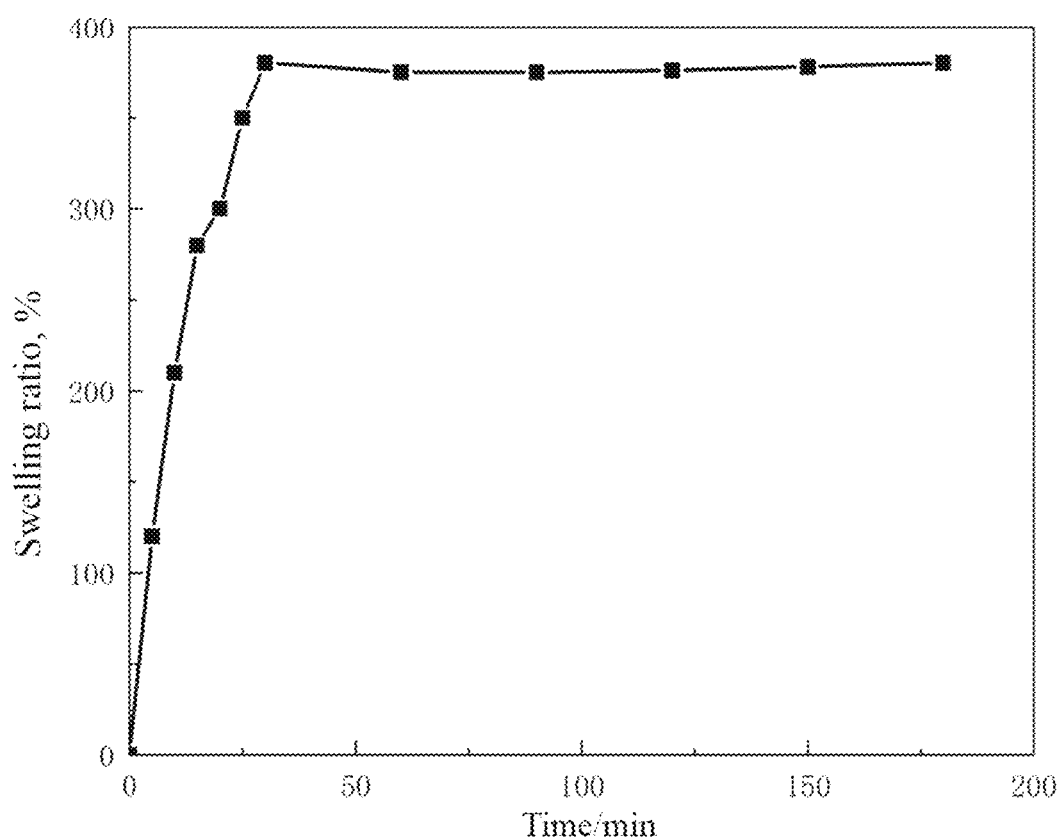
FIG. 2 shows the curve graph illustrating the swelling ratios of the temporary plugging agent obtained in Example 1 in a medium having a pH value of 7.

The temporary plugging agent was subjected to a test for the swelling ratio over time in the medium with a pH value of 7. The test results were shown in FIG. 2. As can be seen from FIG. 2, the swelling ratio of the temporary plugging agent increases continuously at first, and reaches the maximum value after 30 minutes, and is unchanged with the prolongation of time indicating that the temporary plugging agent has a fast swelling rate, the swelling ratio of which could reach the maximum value in a short time. When injected into the formation, it could play a temporary plugging role quickly and thus has a good temporary plugging effect.

(2) Test of degradation performance of the pH-sensitive temporary plugging agent.

Figure 3:
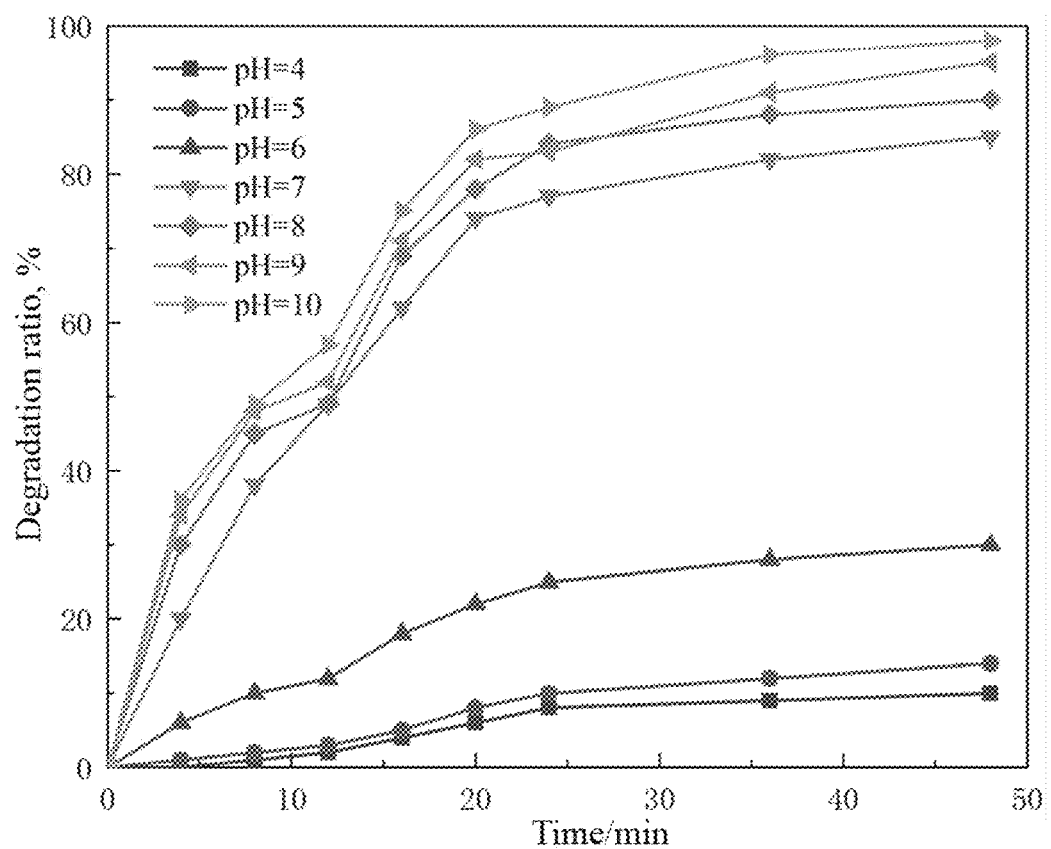
FIG. 3 shows the curve graph illustrating degradation ratios of the temporary plugging agent obtained in Example 1 in media having different pH values.

The degradation ratios of the temporary plugging agent in the media with different pH values were shown in FIG. 3. As can be seen from FIG. 3, the degradation ratios of the temporary plugging agent all increase gradually with the extension of the degradation time; with the increase in the pH value, the degradation rates and final degradation ratios increase. The degradation rates of the temporary plugging agent in the alkaline media is larger than those under an acidic condition. Under the condition that the pH value of the medium is 10, the degradation ratio of the temporary plugging agent reaches 98% at 36 h of degradation. However, in the acidic media, the temporary plugging agent is hardly degraded. The results indicate that the temporary plugging agent could be kept in good state under the acidic condition and could be degraded in alkaline solvent.

EXAMPLE 2

A pH-sensitive temporary plugging agent was prepared according to the following procedures:

3 g of carboxymethyl chitosan and 0.2 g of gelatin were dissolved in 55.02 g of deionized water at 55° C., and they were stirred for 1 hour, to be uniform, to obtain a first mixed solution. 0.1 g of a solution of $AgNO_3$ in ammonia water (0.1 mol/L), namely the initiator, was taken and added dropwise into the first mixed solution to obtain a second mixed solution.

5 g of the toughener (carboxyl-terminated hyperbranched polyester SeHBP C10) was taken and dissolved in 36.68 g of deionized water at room temperature to obtain an aqueous solution of the toughener.

The second mixed solution was mixed with the aqueous solution of the toughener, and the resulting mixture was stirred at 55° C. for 2 hours to undergo the crosslinking reaction. The resulting crosslinked product was lyophilized to obtain the pH-sensitive temporary plugging agent.

EXAMPLE 3

A pH-sensitive temporary plugging agent was prepared according to the following procedures:

4 g of carboxymethyl chitosan and 0.3 g of gelatin were dissolved in 55.02 g of deionized water at 65° C., and they were stirred for 1 hour, to be uniform to obtain a first mixed solution. 0.2 g of a solution of $AgNO_3$ in ammonia water (0.1 mol/L), namely the initiator, was taken and added dropwise into the first mixed solution to obtain a second mixed solution.

7 g of the toughener (carboxyl-terminated hyperbranched polyester SeHBP C20) was taken and dissolved in 36.68 g of deionized water at room temperature to obtain an aqueous solution of the toughener.

The second mixed solution was mixed with the aqueous solution of the toughener, and they were stirred at 65° C. for 1.5 hours to undergo the crosslinking reaction. The resulting crosslinked product was lyophilized to obtain the pH-sensitive temporary plugging agent.

EXAMPLE 4

A pH-sensitive temporary plugging agent was prepared according to the following procedures:

5 g of carboxymethyl chitosan and 0.4 g of gelatin were dissolved in 52.98 g of deionized water at 50° C., and they were stirred for 1 hour, to be uniform, to obtain a first mixed solution. 0.3 g of a solution of $AgNO_3$ in ammonia water (0.1 mol/L), namely the initiator, was taken and added dropwise into the first mixed solution to obtain a second mixed solution.

9 g of the toughener (carboxyl-terminated hyperbranched polyester SeHBP C30) was taken and dissolved in 35.32 g of deionized water at room temperature to obtain an aqueous solution of the toughener;

The second mixed solution was mixed with the aqueous solution of the toughener, and they were stirred at 50° C. for 2 hours to undergo the crosslinking reaction. The resulting crosslinked product was lyophilized to obtain the pH-sensitive temporary plugging agent.

EXAMPLE 5

A pH-sensitive temporary plugging agent was prepared according to the following procedures:

7 g of carboxymethyl chitosan and 0.6 g of gelatin were dissolved in 47.36 g of deionized water at 50° C., and they were stirred for 1 hour, to be uniform, to obtain a first mixed solution. 0.5 g of a solution of $AgNO_3$ in ammonia water (0.1 mol/L), namely the initiator, was taken and added dropwise into the first mixed solution to obtain a second mixed solution.

13 g of the toughener (carboxyl-terminated hyperbranched polyester SeHBP C30) was taken and dissolved in 31.56 g of deionized water at room temperature to obtain an aqueous solution of the toughener.

The second mixed solution was mixed with the aqueous solution of the toughener, and they were stirred at 50° C. for 1 hour to undergo the crosslinking reaction. The resulting crosslinked product was lyophilized to obtain the pH-sensitive temporary plugging agent.

EXAMPLE 6

A pH-sensitive temporary plugging agent was prepared according to the following procedures:

8 g of carboxymethyl chitosan and 0.7 g of gelatin were dissolved in 47.22 g of deionized water at 60° C., and they were stirred for 1 hour, to be uniform, to obtain a first mixed solution. 0.6 g of a solution of $AgNO_3$ in ammonia water (0.1 mol/L), namely the initiator, was taken and added dropwise into the first mixed solution to obtain a second mixed solution.

15 g of the toughener (carboxyl-terminated hyperbranched polyester SeHBP C40) was taken and dissolved in 31.48 g of deionized water at room temperature to obtain an aqueous solution of the toughener.

The second mixed solution was mixed with the aqueous solution of the toughener, and the resulting mixture was stirred at 60° C. for 1 hour to undergo the crosslinking reaction. The resulting crosslinked product was lyophilized to obtain the pH-sensitive temporary plugging agent.

The final degradation ratios of the pH-sensitive temporary plugging agents obtained in Examples 1 to 6 under different pH values were shown in Table 1.

TABLE 1

Final degradation ratios of the pH-sensitive temporary plugging agents obtained in Examples 1 to 6 under different pH values

| pH value | Degradation ratio, % | | | | | |
|---|---|---|---|---|---|---|
| | Example 1 | Example 2 | Example 3 | Example 4 | Example 5 | Example 6 |
| 4 | 10 | 11 | 9 | 9.5 | 9 | 10 |
| 5 | 14 | 16 | 14 | 14.6 | 12 | 15 |
| 6 | 30 | 34 | 32 | 40 | 28 | 42 |
| 7 | 85 | 88 | 80 | 83.4 | 78 | 81 |
| 8 | 90 | 93 | 86 | 92 | 85 | 86 |
| 9 | 95 | 96 | 92 | 97 | 87 | 88 |
| 10 | 98 | 98 | 95 | 98.3 | 92 | 95.6 |

The test results of the swelling ratio of the pH-sensitive temporary plugging agents obtained in Examples 1 to 6 in a medium with a pH value of 7 were shown in Table 2.

TABLE 2 the swelling ratio of the pH-sensitive temporary plugging agents obtained in Examples 1 to 6

| | Swelling ratio, % | | | | | | | | |
|---|---|---|---|---|---|---|---|---|---|
| | Time/minutes | | | | | | | | |
| Examples | 0% | 5% | 10% | 15% | 20% | 25% | 30% | 60% | 90% |
| Example 1 | 0 | 120 | 210 | 280 | 300 | 350 | 380 | 375 | 380 |
| Example 2 | 0 | 100 | 215 | 290 | 310 | 365 | 385 | 384 | 385 |
| Example 3 | 0 | 125 | 230 | 279 | 297 | 351 | 370 | 370 | 370 |
| Example 4 | 0 | 126 | 228 | 282 | 308 | 370 | 375 | 375 | 376 |
| Example 5 | 0 | 117 | 206 | 269 | 274 | 312 | 355 | 360 | 360 |
| Example 6 | 0 | 113 | 119 | 267 | 293 | 346 | 371 | 370 | 372 |

The pH-sensitive temporary plugging agents obtained in Examples 1 to 6 were subjected to a plugging performance test according to the following method.

The plugging and plugging removal performance tests were conducted by using natural core with the specification of Φ30 mm×100 mm, and the changes of permeability of the core before and after plugging were tested according to the Darcy-Weisbach' Formula as shown in Formula I, $$K = Q\mu L A \cdot \Delta P \quad \text{Formula I}$$

where Q represents the flow rate of liquid passing through the core in $cm^3/s$;

μ represents the viscosity of a displacement fluid in mPa·s;

L represents the length of core plug in cm;

A represents the cross sectional area of the core in $cm^2$; and

ΔP represents the displacement pressure in $10^{-1}$ MPa.

A multifunctional displacement system was used as an experimental device, fractures were made in the core after oil scrubbing, a confining pressure of 25 MPa was applied, water (common tap water or deionized water) was first used for displacement, thereby an initial permeability $K_1$ of the core was measured. A temporary plugging agent with a mass percentage of 30% was dispersed into the water for displacement, the changes of the displacement pressure were recorded after it was observed that the liquid outlet rate at the tail of a core holder was constant or substantially constant, and the permeability $K_2$ after plugging was determined according to Formula I. A plugging removal effect test was conducted by placing the core injected with the temporary plugging material in an alkaline solution at 30° C. (the alkaline solution is an aqueous solution with a pH value of 10, which is prepared from sodium hydroxide and deionized water) for 12 hours. Then the core was taken out and then subjected to a displacement with water again to obtain the permeability $K_3$ after plugging removal. The ratio of $K_3$ to $K_1$ was defined as the permeability recovery value of the core, and the ratio of $K_2$ to $K_1$ was defined as the plugging rate.

The test results were as shown in Table 3:

TABLE 3

Plugging rates and permeability recovery values of the pH-sensitive temporary plugging agents obtained in Examples 1-6

| Examples | Plugging rate, % | permeability recovery value, % |
|---|---|---|
| Example 1 | 91.65 | 95.01 |
| Example 2 | 89.24 | 94.77 |
| Example 3 | 82.51 | 95.64 |
| Example 4 | 88.63 | 91.84 |
| Example 5 | 90.25 | 92.16 |
| Example 6 | 85.72 | 93 |

As can be seen from Table 3, the plugging rates of the pH-sensitive temporary plugging agents obtained in Examples 1 to 6 are all above 85%, indicating good plugging effects, and the permeability recovery value is above 90%, indicating good plugging removal performance.

It can be seen from the above examples that the pH-sensitive temporary plugging agent according to the present disclosure not only has a good plugging effect, but also has strong acid resistance. It could stably exist under acidic conditions, could be degraded just by an alkaline solvent, and causes little damage to formations.

The above description is only preferred embodiments of the present disclosure. It should be pointed out that, for those of ordinary skill in the art, several improvements and modifications could be made without departing from the principle of the present disclosure. These improvements and modifications should also be considered as falling within the claimed scope of the present disclosure.

What is claimed is:

1. A method for preparing a pH-sensitive temporary plugging agent, comprising:
    mixing raw materials to obtain a final mixed solution, the raw materials comprising, in percentages by mass,
    3-8% of carboxymethyl chitosan,
    0.2-0.7% of gelatin,
    0.1-0.6% of an initiator,
    5-15% of a toughener, and
    a balance of water,
        wherein the initiator is a solution of $AgNO_3$ in ammonia water having a concentration of 0.1-0.3 mol/L, and
        the toughener is a carboxyl-terminated hyperbranched polyester; and
    subjecting the final mixed solution to a crosslinking reaction at 40-60° C. to obtain the pH-sensitive temporary plugging agent.

2. The method as claimed in claim 1, wherein the mixing raw materials comprises:
    mixing carboxymethyl chitosan, gelatin with one part of water at 50-70° C. to obtain a first mixed solution;
    adding the initiator dropwise into the first mixed solution to obtain a second mixed solution;
    mixing the toughener with the other part of water to obtain an aqueous solution of the toughener; and
    mixing the second mixed solution with the aqueous solution of the toughener to obtain the final mixed solution.

3. The method as claimed in claim 2, wherein a mass ratio of the one part of water to the other part of water is in the range of (1-2): 1.

4. The method as claimed in claim 1, wherein the crosslinking reaction is performed for 0.5-2 hours.

5. The method as claimed in claim 1, further comprising, after the crosslinking reaction, lyophilizing the resulting crosslinked product.

6. The method as claimed in claim 1, wherein the raw materials comprises, in percentages by mass,
    3.5-7% of carboxymethyl chitosan,
    0.3-0.6% of gelatin,
    0.2-0.5% of the initiator,
    6.5-14.5% of the toughener, and
    the balance of water.

7. The method as claimed in claim 4, further comprising, after the crosslinking reaction, lyophilizing the resulting crosslinked product.

* * * * *